March 3, 1931. W. H. GREEN 1,794,765
WATER SOFTENING APPARATUS
Original Filed June 13, 1927
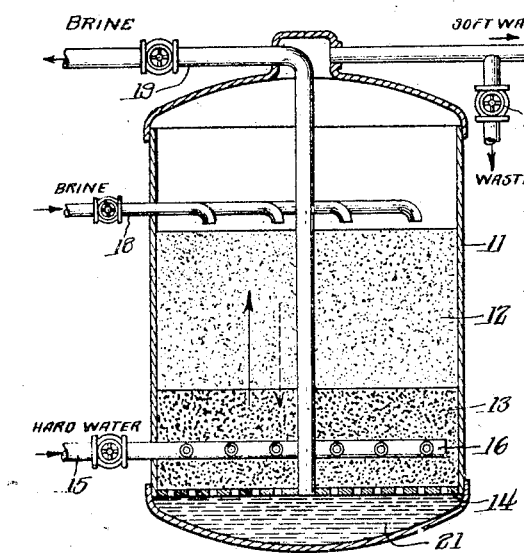
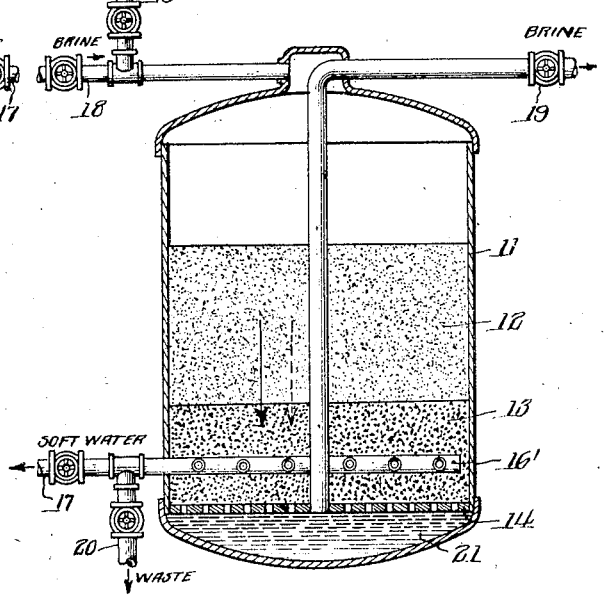
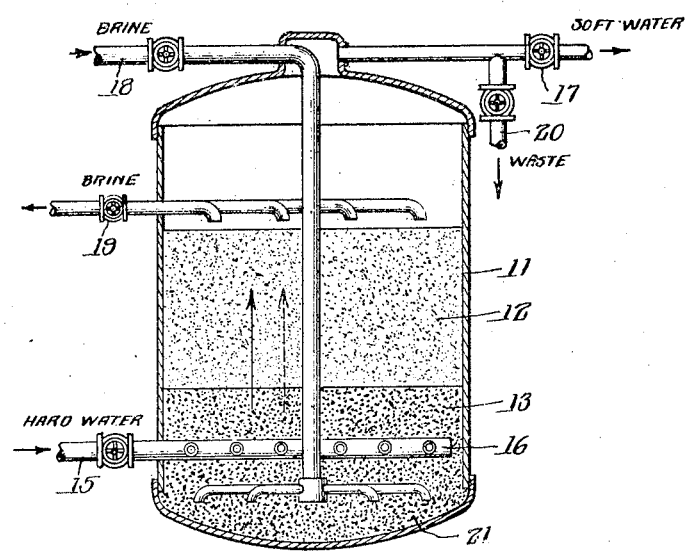
Inventor
Walter H. Green,
By Cromwell, Greist & Warden
Attys.

Patented Mar. 3, 1931

1,794,765

UNITED STATES PATENT OFFICE

WALTER H. GREEN, OF CHICAGO, ILLINOIS, ASSIGNOR, BY MESNE ASSIGNMENTS, TO INTERNATIONAL FILTER COMPANY, OF CHICAGO, ILLINOIS, A CORPORATION OF DELAWARE

WATER-SOFTENING APPARATUS

Application filed June 13, 1927, Serial No. 198,598. Renewed September 15, 1930.

This invention relates to water softening apparatus.

Natural and artificial base exchange silicates, commonly called "zeolites", have been coming into wide use for softening water. The utility of "zeolites" for this purpose depends upon their property of taking up calcium and magnesium from hard water on contact therewith, while simultaneously giving up the equivalent of sodium thereto, and of subsequently reexchanging the calcium and magnesium for sodium on contact with a regenerating agent such as a solution of sodium chloride.

While the softening action is a result of the properties of the zeolite material itself, it is necessary to have a suitable apparatus in order to commercially soften water. Such apparatus consists of a casing within which is a bed of zeolite, usually disposed upon a layer of sand or gravel. Suitably valved pipe connections control the inlet to, and outlet from, the casing for the passage of the water and regenerating solution. The flow of water to be softened may be either upward or downward through the zeolite bed and likewise the flow of regenerating brine may be in either direction. The important point is not the direction of flow, but that the contact of both water and brine with the zeolite be uniform throughout the bed.

The strength of the brine commercially used for regeneration varies widely, but is commonly from 5° to 10° Baumé. The volume required varies with such factors as the amount of zeolite to be regenerated, the strength of the brine, the characteristics of the particular zeolite, etc. It is considered good practice that the volume of brine be at least sufficient to fill the voids between the grains of zeolite in the bed and frequently it is several times this amount.

After contact of the brine with the zeolite it must be removed from the bed to prevent contamination of the water admitted for softening. Sometimes this has been done by an upward flow of water through the bed whereby the brine is carried off and sometimes the brine has been drained off from the bottom followed by a flow of water to thoroughly cleanse the zeolite bed.

In the past it has been thought necessary to not only remove the brine from the zeolite bed, but also to thoroughly cleanse the container of all brine to avoid subsequent contamination of the flow of water. To secure this an outlet for the brine and brine washwater has been provided at the lowest point of the casing when the regenerating flow was downward, or when the brine was washed out upwardly care has been taken to bring the wash water in so as to flush out all parts of the casing. As such casings commonly must withstand internal pressure they are usually made with rounded heads. It is frequently inconvenient and undesirable to provide a pipe connection at the lowest point of such a casing, involving as this does, the elevation of the tank a greater distance from the floor. Likewise, it is not easy to provide a pipe system whereby the brine may be thoroughly washed out of such rounded space in an upward direction.

To meet this difficulty it has become customary to fill the lower part of the casing with concrete so as to provide a level bottom which could be drained through the side or from which the brine could be readily washed. This is objectionable not only because of the cost of concrete and because the concrete is subject to disintegration from the action of the brine, but also because to secure thorough cleansing, it is necessary to partly imbed the lower pipe system in the concrete which makes any repair to the piping difficult and expensive.

It has been found that contrary to the previously accepted belief and practice, it is unnecessary to completely remove the brine from the casing, but that large quantities may be allowed to remain therein with consequent economies and advantages both of construction and of operation, as long as the active part of the zeolite bed itself is freed and kept substantially free of brine before and during the softening operation.

The object of this invention is to provide a simplified apparatus wherein zeolites may be used for softening water and then regenerated and freed from brine.

Another object of this invention is to provide a simplified water softening apparatus which can be washed readily and quickly to free the functioning zeolite bed of salt solution.

A further object of this invention is to provide a simplified water softening apparatus in which a residual part of the regenerating solution can be left in the casing without a substantial contamination of the water passing through the functioning zeolite bed.

According to the present invention, the lower part of the casing constitutes a chamber or space wherein the brine by reason of its greater specific gravity may collect and remain undisturbed by the flow of water above it.

Upon the drawings is illustrated several embodiments of the invention.

In the drawings:

Figures 1 to 3 represent different casings with different connections which can be used in carrying out this invention.

In Figures 1 to 3, 11 represents a casing which contains a zeolite bed or layer 12 which may be supported by a gravel bed 13. The zeolite bed may also act as its own support (not shown), or it may be supported directly (not shown) or intermediately through a gravel bed by a perforated diaphragm 14, the latter being shown in Figures 1 and 2, said diaphragm being at a point substantially above the bottom of the casing. In Figures 1 and 3, the hard water to be softened is admitted into the lower part of the casing by the entrance pipe 15, which is shown having an outlet at the distributor 16, so that an upward flow of the water to be softened will ensue and the soft water is taken off through the outlet pipe 17. In Figure 2 the hard water to be softened is admitted into the upper part of the casing so that the water to be softened will flow downwardly through the zeolite bed during the softening process, the soft water which results after the treatment with the zeolite flowing into the outlet pipe 17 by means of the distributor 16'.

When the zeolite bed 12 is exhausted and requires regeneration, the flow of hard water is shut off and a regenerating solution of brine is passed through the bed. The brine enters through the inlet pipe 18 and flows downwardly in Figures 1 and 2 and upwardly in Figure 3, through the bed of zeolite and passes out of the casing through the brine outlet pipe 19.

When the zeolite has been thoroughly regenerated, the flow of the brine solution is cut off, and hard water is then run through the casing from the inlet pipe 15 and the effluent is run to waste through the outlet pipe 20 until all the brine in the space therebetween has been washed out, whereupon the outlet to waste 20 is cut off and the resultant soft water is taken out through connection 17.

In Figures 1 and 3 the hard water inlet 15, and in Figure 2 the soft water outlet 17, have openings near the lower part of the casing, but substantially removed from the bottom of the casing so that the flow of hard water into the casing will leave undisturbed a large space or chamber 21, containing liquid. This space 21 will be filled with brine, since the brine solution, due to its greater specific gravity will sink down and replace the water, which might be contained in such space. This body of brine will stay in the bottom of the casing during the successive alternations of softening and regeneration. The space or chamber filled with the brine will form an excellent false bottom for the casing.

To minimize the diffusion of the salt solution and the contamination of the zeolite bed or layer with brine, it is preferable to place the lowermost brine connection below the lowermost water connection as shown in Figures 1 to 3 where the outlet (Figures 1 and 2) or the inlet (Figure 3) for the brine, are below the hard water inlet (Figures 1 and 3) or below the soft water outlet (Figure 2). The use of a diaphragm as in Figures 1 and 2 also tends toward accomplishing the same result.

What is claimed is:

1. A water softening apparatus comprising a casing, a filter bed consisting of a layer of non-zeolitic material and a layer of zeolites disposed on the first mentioned layer, means for passing the water to be softened through the casing, means for cutting off the supply of water on the exhaustion of the zeolites, means for passing through the zeolite bed a solution of a salt capable of regenerating the zeolites, a brine chamber in the lower part of the casing, said water passing means and said salt solution passing means being positioned a substantial distance above the bottom of the casing, and means to maintain a permanent brine pocket in the bottom of said casing.

2. A water softening apparatus comprising a casing, a filter bed within said casing, a layer of zeolites disposed on said filter bed, means for passing the water through the casing, means for passing a regenerating solution through the zeolite layer, said last mentioned means including an exit and an admission, the lowermost thereof within the casing being substantially above the bottom of such casing and the lowermost portion of the water passing means within the casing being substantially above the lowermost regenerating solution passing means.

3. Water softening apparatus comprising a casing, a bed consisting of a layer of zeolites, supporting means for said bed, means for passing the water through the zeolite bed, means for cutting off the supply of water on the exhaustion of the zeolites, means for supplying and passing through the zeolite layer a solution of a salt capable of regenerating zeolites, said casing having a brine storage chamber in the lower part thereof, said water passing means being above said salt passing means and said salt passing means being above the bottom of the casing and said brine storage chamber being below the zeolites.

4. A water softening apparatus comprising a casing, a bed of zeolitic base exchange material therein, means for passing water to be treated through said bed, and means for passing a regenerating salt solution through said bed, all of said means being substantially above the bottom of the casing, and said passing means being so arranged as to cause all flow of liquid up through or down through the casing to commence or cease, respectively, at a point substantially above the bottom of the casing.

5. A water softening apparatus, comprising a casing, a bed of zeolitic base exchange material therein, means for passing water to be treated through said bed, means for passing a regenerating salt solution through said bed, the lowermost opening of said first mentioned means into the casing being above the lowermost opening of said second mentioned means into the casing, and a storage space for salt solution below the bed of zeolites, the exit and admission parts of said passing means being arranged in pairs above and below said bed.

6. A water softening apparatus comprising a casing, a bed of gravel, a bed of zeolites supported thereon, a pipe system for passing water to be softened, wash water and regenerating brine through the casing and within such supporting bed, and a permanent brine space below said pipe system.

7. A water softening apparatus comprising a casing, a bed of zeolites, a brine chamber below said bed of zeolites and means for treating said zeolites alternately with water to be softened and with brine, the exit of the brine in downflow regeneration or the entrance of the brine in upward regeneration, being below the entrance and the exit of the water to be softened so as to form a permanent quiescent brine pocket.

8. A water softening apparatus comprising a casing, a bed of zeolites, a permanent quiescent brine chamber in the lower part of such casing, a pipe system for successively passing water to be softened and brine into contact with the zeolites, said pipe system being above said brine chamber.

9. In a water softening apparatus, a casing, a bed of zeolitic base exchange material therein, means for passing water to be treated through said bed, and means for passing a brine solution through said bed, each of said means comprising separate exit and admission connections which are arranged above and below the bed of zeolitic base exchange material in pairs, the lowermost pair being substantially above the bottom of the casing and being positioned so that there will be no direct passage of liquid through a considerable space below said means adjacent to the bottom of the casing.

10. The apparatus of claim 9 in which a perforated diaphragm is utilized to separate the lowermost brine and water exit or admission connections.

11. The apparatus of claim 9 in which the lowermost water and brine admission or exit connections are placed closely adjacent to each other and in which the uppermost brine passing means is placed closely adjacent to and slightly above the top of the zeolitic bed.

12. In a water softening apparatus, a casing, a bed of zeolitic base exchange material therein, means for passing the water to be treated and means for passing the brine solution through said bed, each of said means comprising exit and admission connections, which connections are arranged in pairs above and below the zeolitic bed, the lowermost brine connection being formed by a central conduit extending down through the casing and terminating in a perforated diaphragm which is spaced substantially above the bottom of the casing.

In testimony whereof I have hereunto subscribed my name.

WALTER H. GREEN.